(12) United States Patent
Mabuchi

(10) Patent No.: US 8,699,365 B2
(45) Date of Patent: Apr. 15, 2014

(54) COMMUNICATION DEVICE AND HEADER COMPRESSION CONTROL METHOD

(75) Inventor: Tetsuo Mabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 13/060,576

(22) PCT Filed: Aug. 10, 2009

(86) PCT No.: PCT/JP2009/064115
§ 371 (c)(1),
(2), (4) Date: Feb. 24, 2011

(87) PCT Pub. No.: WO2010/024114
PCT Pub. Date: Mar. 4, 2010

(65) Prior Publication Data
US 2011/0149790 A1    Jun. 23, 2011

(30) Foreign Application Priority Data
Aug. 25, 2008 (JP) .................................. 2008215257

(51) Int. Cl.
*H04W 28/06* (2009.01)
*H04W 28/04* (2009.01)

(52) U.S. Cl.
USPC ........... 370/252; 370/229; 370/230; 370/394; 370/236; 709/247; 709/246

(58) Field of Classification Search
CPC ...... H04W 28/06; H04W 28/04; H04L 69/04; H04L 69/22
USPC ......... 370/252, 229, 230, 390, 394, 235, 236, 370/474, 477, 392, 349, 389; 709/247, 246
See application file for complete search history.

(56) References Cited

U.S. PATENT DOCUMENTS

| 8,059,632 B2* | 11/2011 | Xu ................................ 370/352 |
| 2002/0059464 A1* | 5/2002 | Hata et al. ..................... 709/247 |
| 2008/0320171 A1* | 12/2008 | Walsh et al. .................. 709/247 |

FOREIGN PATENT DOCUMENTS

| JP | 2002135362 A | 5/2002 |
| JP | 2002158739 A | 5/2002 |
| JP | 2002538672 A | 11/2002 |
| JP | 2004194232 A | 7/2004 |
| JP | 2005-51684 A | 2/2005 |
| JP | 2006287284 A | 10/2006 |
| JP | 2006333407 A | 12/2006 |

OTHER PUBLICATIONS

Minaburo et al., "Configuration and Analysis of Robust Header Compression in UMTS", The 14th IEEE 2003 International Symposium on Personal, Indoor and Mobile Radio Communication Proceedings, vol. 3, Sep. 2003, pp. 2402-2406.*

(Continued)

*Primary Examiner* — Charles C Jiang
*Assistant Examiner* — Jamal Javaid
(74) *Attorney, Agent, or Firm* — Sughrue Mion, PLLC

(57) ABSTRACT

A communication device according to the present invention includes a header compressor (121) which measures a time from a start of communications with a communication partner and changes a compression ratio of a header of a packet to a compression ratio lower than a present compression ratio each time that a time represented by a timer value elapses, and a controller (12) which controls the timer value based upon at least one information from among channel quality information of the communication device and channel quality information received from the communication partner.

5 Claims, 5 Drawing Sheets

(56) References Cited

OTHER PUBLICATIONS

International Search Report for PCT/JP2009/054115 mailed Oct. 6, 2009.
K. Singh, "Improving Quality of Service and Resource Utilization for Multimedia Streaming over Third Generation Mobile Networks", May 2008, pp. 57-94.
A. Minaburo et al., "Configuration and Analysis of Robust Header Compression in UMTS", The 14th IEEE 2003 International Symposium on Personal, Indoor and Mobile Radio Communication Proceedings, vol. 3, Sep. 2003, pp. 2402-2406.
C. Bormann et al., ROobust Header Compression (ROHC): Framework and four profiles: RTP, UDP, ESP, and uncompressed, Network Working Group, RFC3095, Jul. 2001, pp. 55-74.
Japanese Office Action for JP Application No. 2010-526642 mailed on Nov. 19, 2013 with English Translation.

* cited by examiner

COMMUNICATION DEVICE AND HEADER COMPRESSION CONTROL METHOD

This application is the National Phase of PCT/JP2009/064115, filed Aug. 10, 2009, which is based upon and claims the benefit of priority from Japanese Patent Application No. 2008-215257 filed on Aug. 25, 2008, the content of which is incorporated by reference.

TECHNICAL FIELD

The present invention relates to a communication device including a base station and a mobile station for sending and receiving packets with compressed header information, and a header compression control method.

BACKGROUND ART

ROHC (Robust Header Compression) for compressing headers is prescribed in documents such as RFC-4815 and RFC-3095. An example of a control method for controlling wireless communications between base stations which compress headers according to ROHC and mobile stations which decompress compressed headers is disclosed in JP-A 2006-287284 (hereinafter referred to as Patent document 1).

According to the method disclosed in Patent document 1, the restoration ratio of packets which are received from a transmission side by a reception side in a U (Unidirectional)-mode is determined as an arrival ratio, and the information of the restoration ratio is sent to the transmission side, which controls the period at which full headers and dynamic headers, based on the information of the restoration ratio, are sent.

SUMMARY OF THE INVENTION

According to the technology disclosed in Document 1, the information of the restoration ratio is added to information that is sent back from the reception side to the transmission side in the U-mode. The information of the restoration ratio corresponds to feedback information in an O (Bidirectional Optimistic)-mode or an R (Bidirectional Reliable)-mode.

Originally, the U-mode is not premised on the sending back of feedback information from the reception side to the transmission side. Sending back feedback information in the U-mode results in more reliability as with the B-mode and the R-mode. However, sending back feedback information in the U-mode causes an increase in the information sent over the transmission path. As a consequence, particularly if the transmission path is highly reliable, then the transmission efficiency becomes poor, tending to bring about a delay.

An exemplary object of the invention is to provide a communication device and a header compression control method which make it possible to prevent a transmission efficiency from becoming poor by providing feedback information indicative of the state of restoration of headers thereby optimize the compression efficiency of headers.

A communication device according to an exemplary aspect of the invention comprises a header compressor which measures the time from the start of communications with a communication partner and changes the compression ratio of a header of a packet to a compression ratio lower than the present compression ratio each time that a time represented by a timer value elapses, and a controller which controls the timer value based upon at least one information from among channel quality information of the communication device and channel quality information received from the communication partner.

A header compression control method according to an exemplary aspect of the invention comprises measuring the time from the start of communications with a communication partner and changing the compression ratio of the header of a packet to a compression ratio lower than the present compression ratio each time that a time represented by a timer value elapses, and controlling the timer value based upon at least one information from among channel quality information of the communication device and channel quality information received from the communication partner when the channel quality information is received from the communication partner.

A header compression control method according to an exemplary embodiment of the present invention will be described below. The header compression control method according to the present invention will mainly be described below, and the configuration and operational details of a technology for encoding/decoding packets will not be described below.

Figure 1:
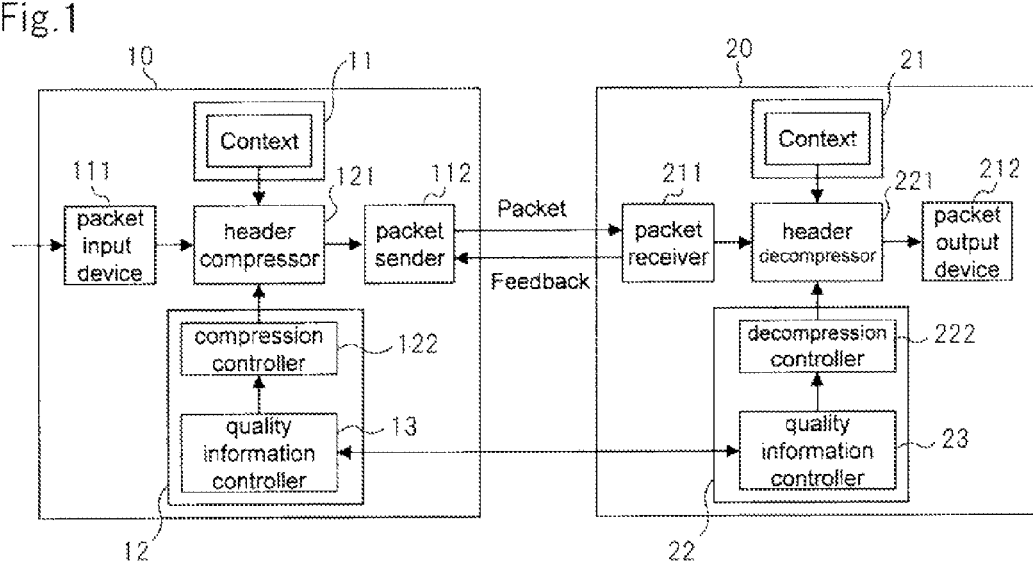
FIG. 1 is a block diagram of a configurational example which is illustrative of a header compression control method according to an exemplary embodiment of the present invention.
Figure 2:
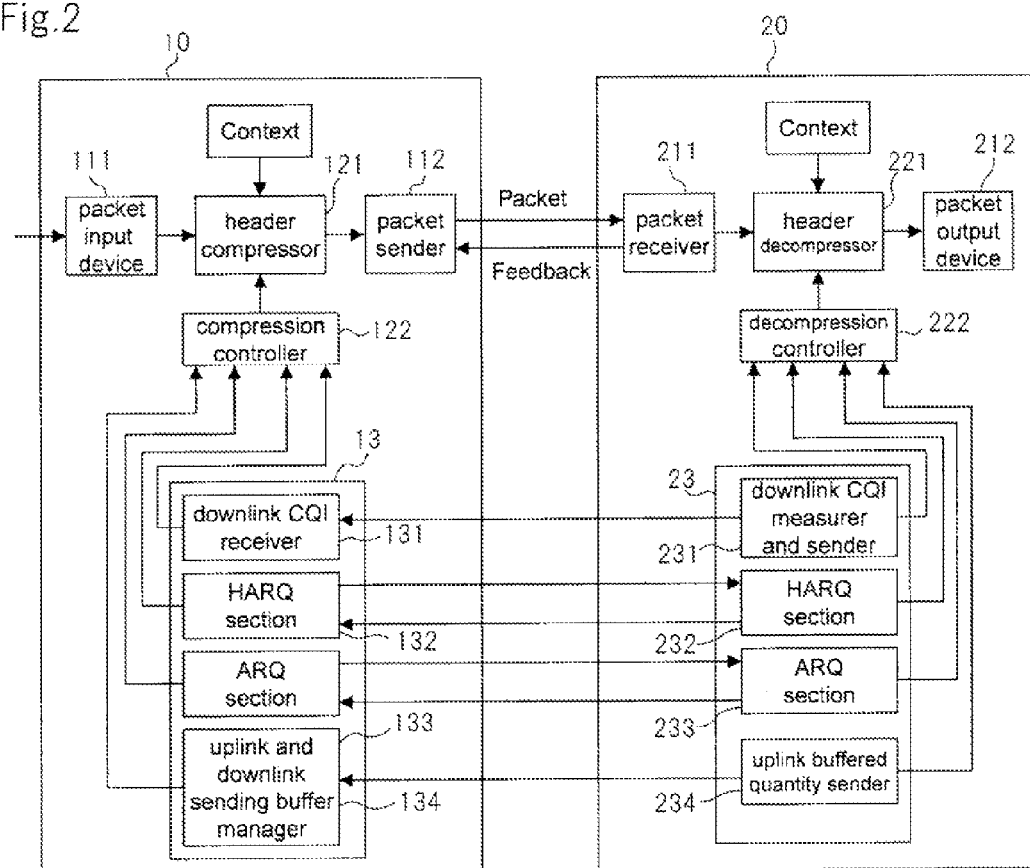
FIG. 2 is a block diagram of a configurational example of a quality information controller shown in FIG. 1.

FIG. 1 is a block diagram of a configurational example which is illustrative of a header compression control method according to an exemplary embodiment of the present invention, and FIG. 2 is a block diagram of a configurational example of a quality information controller shown in FIG. 1.

As shown in FIG. 1, base station 10 and mobile station 20 are connected to each other by a wireless link. Base station 10 is connected to a communication network, not shown. It is assumed that the communication network comprises the Internet. In the present exemplary embodiment, base station 10 serves as a header compression side, and mobile station 20 as a header decompression side.

Base station 10 and mobile station 20 operate in either one of three modes, a U-mode, an O-mode, and an R-mode, depending on the condition of the wireless link. Details of the three modes are disclosed in Patent document 1 and will not be described below.

First, configurational details of base station 10 will be described below.

Base station 10 includes packet input device 111, header compressor 121, storage device 11, packet sender 112, and controller 12. Controller 12 includes compression controller 122 for controlling header compressor 121 with channel quality information collected from a plurality of types of layers if the wireless link is in the U-mode, and quality information controller 13 for supplying channel quality information to compression controller 122.

Storage device 11 stores context information, i.e., information about headers.

In each of the above three modes depending on the condition of the wireless link, header compressor 121 assumes either one of three states, i.e., IR (Initialization and Refresh) State, FO (First Order) State, and SO (Second Order) State. Details of these three states disclosed in Patent document 1 and will not be described below.

Figure 3:
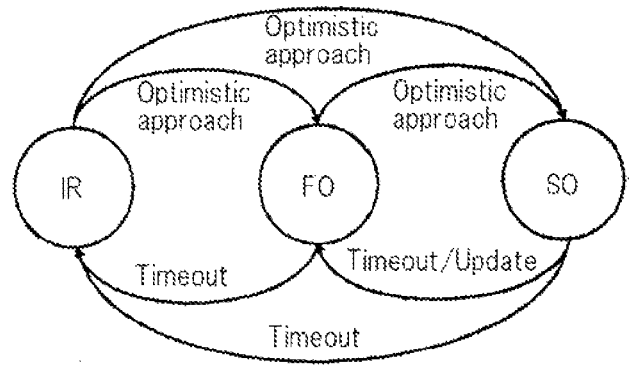
FIG. 3 is a diagram showing state transitions of a header compression side in a U-mode.

FIG. 3 is a diagram showing state transitions in a U-mode according to ROHC for compressing headers which is prescribed in RFC-4815 and RFC-3095.

Header compressor 121 starts to operate from IR State. IR State serves the purpose of initializing the static area of a context and restoring a header after header decompression has failed on the header decompression side. In IR State, header compressor 121 sends a header without compressing all its static and dynamic areas to mobile station 20. FO State serves the purpose of efficiently transmitting the irregularity of a packet stream. In FO State, header compressor 121 partially compresses a dynamic area and updates a portion of a static area. In SO State, the compression of a header is optimized because header compressor 121 compresses the header as much as possible within a prescribed range.

The compression ratio of a header is highest in SO State and lowest in IR State. The level of SO State is higher than the level of FO State and IR State.

In the U-mode, a lowly compressed state of a header transits to a highly compressed state of a header according to the optimistic approach, as shown in FIG. 3. According to the optimistic approach, when the header decompression side receives a packet from the header compression side, if the header compression side believes that the header decompression side has received sufficient information to decompress the compressed header, then the header compression side makes a transition to a highly compressed state. Generally, when the header compression side sends a predetermined number of packets to the header decompression side, the header compression side makes a transition to a state with a higher compression ratio. When such an optimistic approach is taken, even if the header decompression side has not received sufficient information to decompress the compressed header properly, the header compression side tends to compress a header excessively, and the header decompression side is likely to fail to decompress the compressed header.

To avoid the above problem, header compressor 121 makes periodic transitions from higher-level states to lower-level states. As, shown in FIG. 3, there are three transitions from higher-level states to lower-level states, i.e., SO State→FO State, SO State→IR State, and FO State→IR State. The transitions are allocated respective predetermined timer values. Each time that the time represented by a timer value elapses after base station 10 has started sending packets to and receiving packets from mobile station 20, header compressor 121 makes a transition from the present state to a lower-level state. The timer values given to the respective transitions may be identical to each other or different from each other.

When header compressor 121 receives an IP packet via packet input device 111, header compressor 121 compresses the header by referring to the context information stored in storage device 11 according to the present state, and sends the IP packet including the compressed header to mobile station 20 via packet sender 112.

As shown in FIG. 2, quality information controller 13 sends channel quality information of base station 10 to mobile station 20 and receives channel quality information of mobile station 20 from mobile station 20, in constant periodic cycles. Quality information controller 13 includes downlink CQI (Channel Quality Information) receiver 131, HARQ (Hybrid Automatic Repeat reQuest) section 132, ARQ (Automatic Repeat reQuest) section 133, and uplink and downlink sending buffer manager 134. Quality information controller 13 includes a memory (not shown) for storing channel quality information.

When downlink CQI receiver 131 receives downlink CQI as channel quality information from mobile station 20, downlink CQI receiver 131 sends the downlink CQI to compression controller 122. Downlink CQI is, for example, a numerical value such as an SIR (Signal to Interference Ratio) representing channel quality information. The SIR is determined using a downlink reference signal incorporated in a physical layer, which mobile station 20 receives from base station 10. Base station 10 includes fixed data known to mobile station 20 in a downlink reference signal and sends the downlink reference signal to mobile station 20. Then, mobile station 20 demodulates the fixed data included in the downlink reference signal, and compares the demodulated data with the known fixed data to calculate an SIR. In this manner, mobile station 20 measures the downlink CQI. There is a predetermined numerical value used as a reference value to determine whether a channel quality represented by the CQI is poor or not. Such a reference value is referred to as a first threshold value in a downlink environment.

HARQ section 132 sends HARQ information of base station 10 to mobile station 20 and sends HARQ information received from mobile station 20 to compression controller 122. HARQ information is incorporated in a MAC (Medium Access Control) layer of a data link layer, and serves as information for resending control. As the number of times that a packet is resent increases, the channel quality is considered to be poorer. There is a predetermined number of times that a packet is resent, used as a reference value to determine whether a channel quality represented by HARQ information is poor or not. Such a reference value is referred to a second threshold value.

ARQ section 133 sends ARQ information of base station 10 to mobile station 20 and sends ARQ information received from mobile station 20 to compression controller 122. ARQ information is incorporated in an RLC (Radio Link Control) layer of a data link layer, and serves as information for resending control. As the number of times that a packet is resent increases, the channel quality is considered to be poorer. There is a predetermined number of times that a packet is resent, used as a reference value to determine whether channel quality represented by ARQ information is poor or not. Such a reference value is referred to as a third threshold value.

Uplink and downlink sending buffer manager 134 sends buffered quantity information, which is information indicative of a buffered quantity of packets, to compression controller 122. As the buffered quantity of packets is greater, the channel quality is considered to be poorer. A downlink buffered quality represents buffered quality that is managed by base station 10, and an uplink buffered quality represents buffered quality that is managed by mobile station 20. Since these buffered qualities are used as feedback information, they are also used as one of the indexes representing channel quality information. As the buffered quantities are greater, the channel quality is considered to be poorer. There is a predetermined buffered quantity used as a reference value to determine whether channel quality represented by the buffered quantity information is poor or not. Such a reference value is referred to as a fourth threshold value.

Compression controller 122 includes a memory (not shown) which stores the first through fourth threshold values described above. Based on the channel quality information received from quality information controller 13, compression controller 122 controls header compressor 121 as follows: Compression controller 122 compares each piece of the channel quality information described above with a corresponding threshold value, and shortens the timer value by a preset time if the channel quality of either piece of the channel quality information is judged as being poor. When header compressor 121 frequently makes a transition to a lower-level state, the header compression ratio is lowered, resulting in higher reliability. If the channel quality of either piece of the channel quality information is judged as being good, then compression controller 122 increases the timer value by a preset time. When header compressor 121 compresses headers in a higher-level state for a longer time, the header compression ratio is increased. The times by which the timer value is shortened and increased are preset, and may be identical to each other or different from each other.

Compression controller 122 according to the present exemplary embodiment makes decisions with respect to the downlink CQI, the buffered quantity information, and the HARQ information and ARQ information of individual channels, and shortens the timer value if it judges that the channel quality represented by either piece of the information is poor. However, the present invention is not limited to such a control process. Compression controller 122 may shorten the timer value if it judges that the channel qualities represented by plural pieces of the channel quality information are poor.

There are two transitions from SO State to lower-level states, i.e., SO State→FO State (referred to as "first transition") and SO State→IR State (referred to as "second transition"). If compression controller 122 judges that the channel qualities represented by plural pieces of the channel quality information are poor, then compression controller 122 may shorten the timer value for the second transition. If compression controller 122 judges that the channel quality represented by one piece of channel quality information is poor, then compression controller 122 may shorten the timer value for the first transition. It is thus possible to change the manner in which header compressor 121 makes a transition to a lower-level state depending on how poor the channel quality is.

Figure 4:
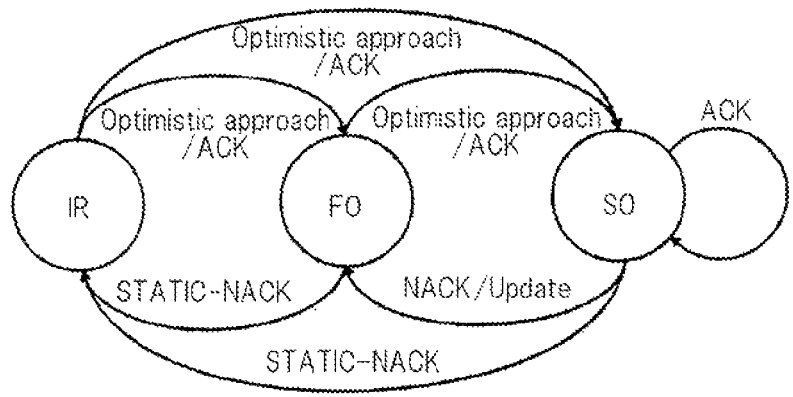
FIG. 4 is a diagram showing state transitions of a header compression side in an O-mode.

State transitions when the wireless link is in the O-mode and the R-mode will be described below. FIG. 4 is a diagram showing state transitions in the O-mode according to ROHC, and FIG. 5 is a diagram showing state transitions in the R-mode according to ROHC.

As shown in FIG. 4, when the wireless link is in the O-mode, header compressor 121 makes transitions to higher-level states in the same manner as with the U-mode. However, when header compressor 121 makes transitions to lower-level states, it does not use a timer value, but uses NACK or STATIC-NACK received from the header decompression side. NACK indicates that the restoration of a dynamic area of context information has failed, and STATIC-NACK indicates that the restoration of a static area of context information has failed. When header compressor 121 receives NACK as feedback information from mobile station 20, header compressor 121 makes the transition SO State→FO State. When header compressor 121 receives STATIC-NACK as feedback information from mobile station 20, header compressor 121 makes the transition SO State→IR State or FO State→IR State.

Figure 5:
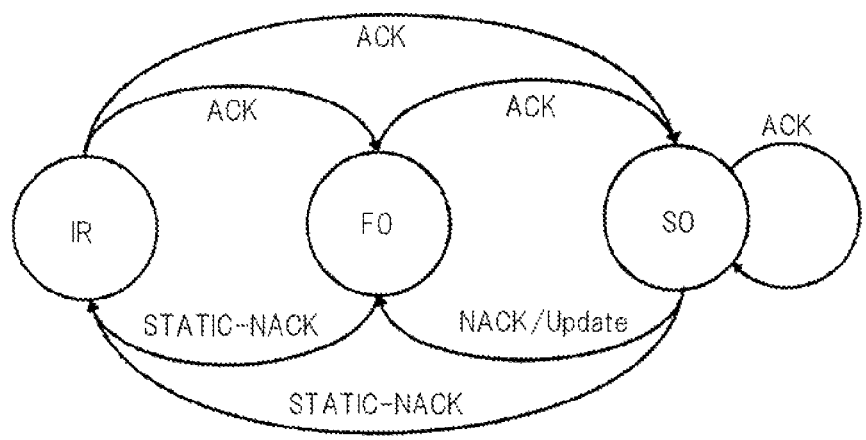
FIG. 5 is a diagram showing state transitions of a header compression side in an R-mode.

As shown in FIG. 5, when the wireless link is in the R-mode, header compressor 121 uses ACK from the header decompression side when it makes transitions to higher-level states. ACK indicates that the restoration of a packet has been successful. When header compressor 121 receives ACK as feedback information from mobile station 20, header compressor 121 makes the transition IR State→FO State, IR State→SO State, or FO State→SO State. Header compressor 121 uses NACK or STATIC-NACK as with the O-mode when it makes transitions to lower-level states.

Configurational details of mobile station 20 will be described below.

Mobile station 20 includes packet receiver 211, header decompressor 221, storage device 21, packet output device 212, and controller 22. Controller 22 includes decompression controller 222 for controlling header decompressor 221 by using channel quality information collected from a plurality of types of layers, and quality information controller 23 for supplying channel quality information to decompression controller 222.

In each of the above three modes depending on the condition of the wireless link, header decompressor 221 assumes either one of three states, i.e., NC (No Context) State, SC (Static Context) State, and FC (Full Context) State. NC State is a state free of context or lacking sufficient context of a static area. FC State is a state with sufficient context. Header decompressor 221 takes a higher-level state if the context information is sufficient. Details of these three states are disclosed in Patent document 1 and will not be described below.

Figure 6:
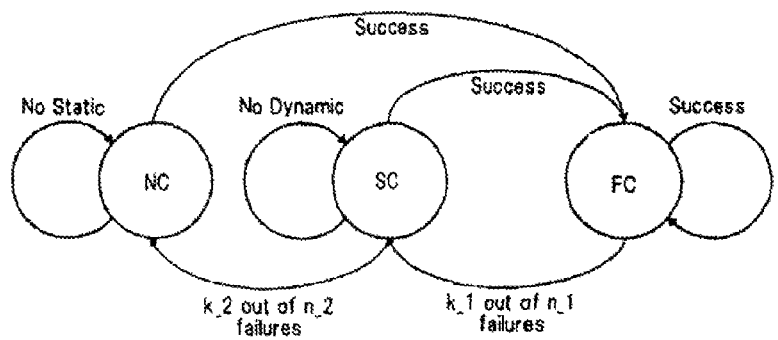
FIG. 6 is a diagram showing state transitions of a header decompression side.

FIG. 6 is a diagram showing state transitions according to ROHC for decompressing headers which is prescribed in RFC-4815 and RFC-3095. State transitions in the O-mode and the R-mode will be described below.

When a CRC (Cyclic Redundancy Check) for detecting the occurrence of a bit error in data transmission has failed, header decompressor 221 assumes that the present header is suffering an error and discards the header. Then, header decompressor 221 sends NACK to base station 10.

In FC State, when $k\_1$ CRCs of $n\_1$ CRCs have failed, header decompressor 221 assumes that the context is damaged and sends NACK to base station 10. Header decompressor 221 makes a transition to SC State and discards all packets until packets IR, IR-DYN, UOR-2 which have passed CRCs are updated. The value $k\_1/n\_1$ indicates the ratio of failures, and serves as a reference value to determine whether to make a transition to a lower-level state or not.

In SC State, when $k\_2$ CRCs of $n\_2$ CRCs for the packets IR, IR-DYN, UOR-2 have failed, header decompressor 221 assumes that the context is damaged and sends STATIC-NACK to base station 10. Then, header decompressor 221 makes a transition to NC State. The value $k_{\_2/n\_2}$ indicates the ratio of failures, and serves as a reference value to determine whether to make a transition to a lower-level state or not.

In NC State, header decompressor 221 discards all packets until packet IR which has passed a CRC is updated.

When header decompressor 221 receives an IP packet via packet receiver 211, header decompressor 221 decompresses the header of the IP packet using the context information to restore the header, and transfers the IP packet including the restored header to packet output device 212.

Quality information controller 23 sends channel quality information of mobile station 20 to base station 10 and receives channel quality information of base station 10 from base station 10, in constant periodic cycles. Quality information controller 23 includes downlink CQI measurer and sender 231, HARQ section 232, ARQ section 233, and uplink buffered quantity sender 234.

Downlink CQI measurer and sender 231 measures a channel quality as downlink CQI using a downlink reference signal received from base station 10, sends the downlink CQI to base station 10, and sends the downlink CQI to decompression controller 222.

HARQ section 232 sends HARQ information of mobile station 20 to base station 10 and sends HARQ information received from base station 10 to decompression controller 222. ARQ section 233 sends ARQ information of mobile station 20 to base station 10 and sends ARQ information received from base station 10 to decompression controller 222. As with the HARQ information and the ARQ information in base station 10, there are preset threshold values used as reference values to determine whether channel qualities represented by HARQ and ARQ information are poor or not.

Uplink buffered quantity sender 234 sends the information of an uplink buffered quantity to base station 10 and sends the information of the uplink buffered quantity to decompression controller 222. Base station 10 may use the information of the uplink buffered quantity in order to schedule the assignment of resources of a plurality of mobile stations 20 that are connected by the wireless link, and the information of the uplink buffered quantity may be included in scheduling request information of a physical layer.

Decompression controller 222, which includes a memory (not shown) which stores threshold values for various pieces of channel quality information, controls header decompressor 211 based on the channel quality information received from quality information controller 23, as follows: After k CRCs of n CRCs failed, header decompressor 221 made a transition to a lower-level state such as FC→SC or SC→NC. Decompression controller 222 controls header decompressor 221 using parameters (n, k) based on the channel quality information.

If decompression controller 222 judges that the channel quality is good by comparing the channel quality information with its threshold value, then decompression controller 222 selects parameters (n, k) such that k/n is larger, allowing header decompressor 221 to easily make a transition to a lower-level state. If decompression controller 222 judges that the channel quality is poor by comparing the channel quality information with its threshold value, then decompression controller 222 selects parameters (n, k) such that k/n is smaller, preventing header decompressor 221 from frequently making a transition to a lower-level state.

There are a plurality of predetermined combinations of parameters (n, k) each for making k/n larger and for making k/n smaller. Decompression controller 222 selects either one of the combinations-according to a predetermined procedure. The predetermined combinations of parameters (n, k) are registered in a memory (not shown) included in decompression controller 222.

Decompression controller 222 may control header decompressor 221 based on the judgement about either one of the plural types of channel quality information or based on the judgement about the plural types of channel quality information.

In the present exemplary embodiment, a downlink data flow from base station 10 to mobile station 20 as shown in FIG. 1 has been described above. However, an uplink data flow may similarly be controlled. For such an uplink data flow, base station 10 carries out the above header decompression control, and mobile station 20 carries out the above header compression control. Since operational details of those header compression and decompression control processes are the same as those described above, they will not be described below. The communication device of each of base station 10 and mobile station 20 may include header compressor 121, header decompressor 221, controller 12, and controller 22 shown in FIG. 1 for performing the header decompression control and the header compression control.

Each of controllers 12, 22 may comprise a dedicated circuit for performing the above control process, or a memory (not shown) for storing a program which includes the details of the above control process and a CPU (Central Processing Unit) (not shown) for executing the program.

Figure 7:
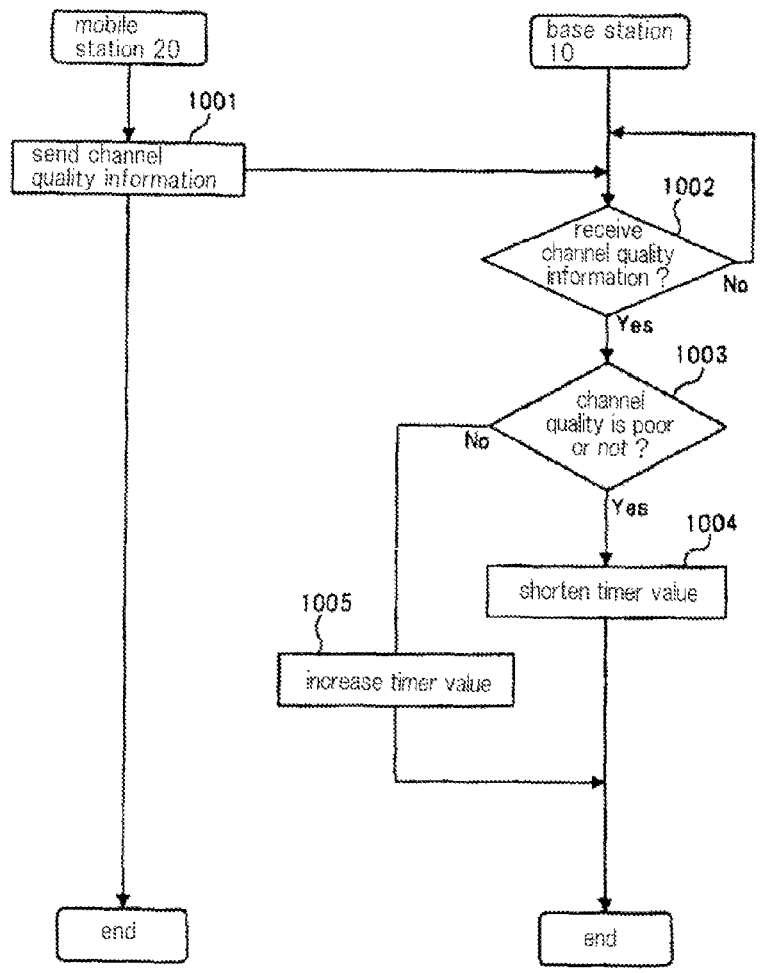
FIG. 7 is a sequence diagram showing an operation sequence of a header compression control method according to the exemplary embodiment of the present invention.
Figure 8:
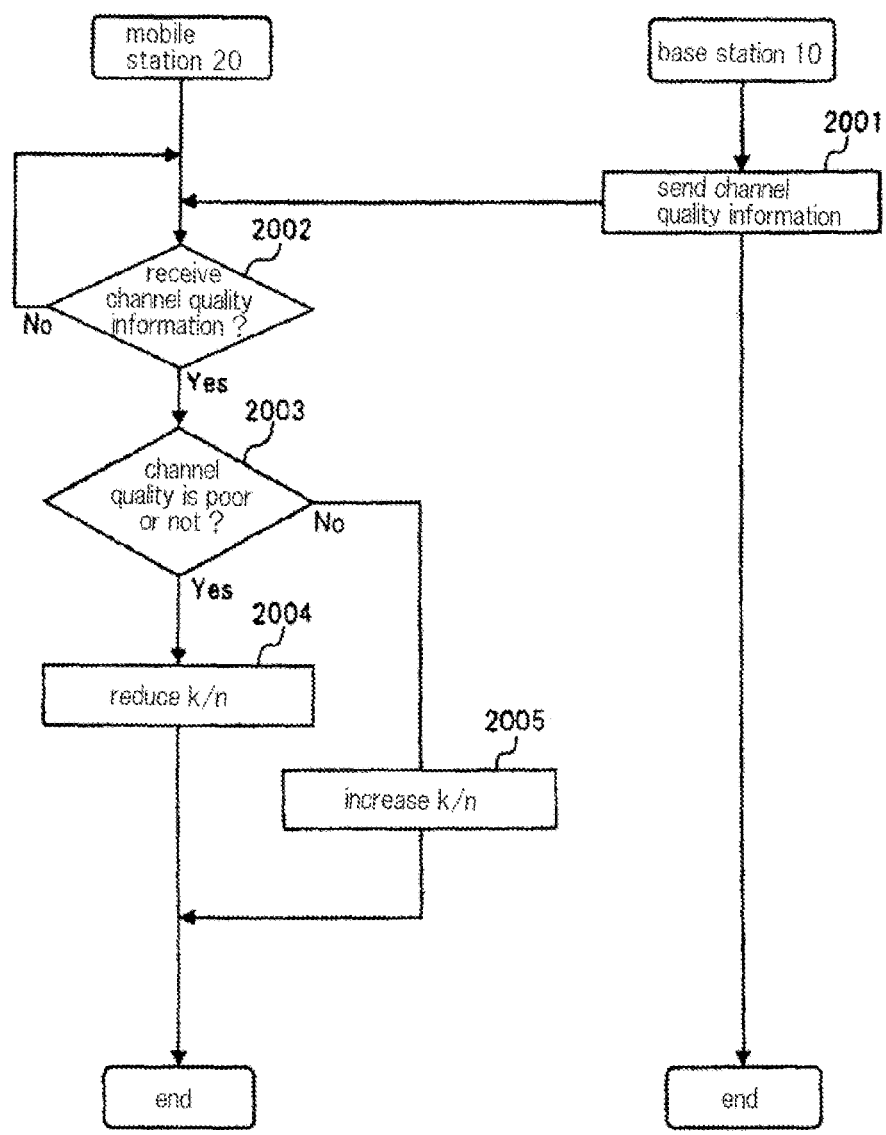
FIG. 8 is a sequence diagram showing an operation sequence of a header decompression control method according to the exemplary embodiment of the present invention.

Operation of base station 10 for the header compression control will be described below. The wireless link is in the U-mode. FIG. 7 is a sequence diagram showing an operation sequence of a header compression control method according to the present exemplary embodiment.

Mobile station 20 sends channel quality information to base station 10 (step 1001). When base station 10 receives the channel quality information from mobile station 20 (step 1002), base station 10 compares the channel quality information with a threshold value to determine whether the channel quality represented thereby is poor or not (step 1003). If base station 10 judges that the channel quality is poor, then base station 10 shortens the timer value of header compressor 121 by a preset time (step 1004). Conversely, if base station 10 judges that the channel quality is good, then base station 10 increases the timer value of header compressor 121 by a preset time (step 1005).

A specific example of the process of judging the channel quality in step 1003 will be described below. If the channel quality information is downlink CQI and the downlink CQI is smaller than the first threshold value, then the circuit quality is judged as poor. If the channel quality information is HARQ information and the number of times that a packet is resent, as represented by the HARQ information, is greater than the second threshold value, then the circuit quality is judged as poor. If the channel quality information is ARQ information and the number of times that a packet is resent as represented by the ARQ information is greater than the third threshold value, then the circuit quality is judged as poor. If the channel quality information is buffered quantity information and a buffered quantity which is represented by the buffered quantity information is greater than the fourth threshold value, then the circuit quality is judged as poor.

Figure 9:
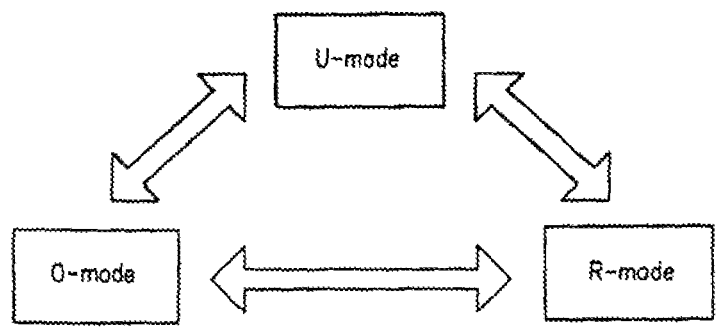
FIG. 9 is a diagram showing an example of transitions between the modes. Exemplary embodiment of the present invention.

Operation of mobile station 20 for the header decompression control will be described below. The wireless link is in the O-mode or the R-mode. FIG. 9 is a sequence diagram showing an operation sequence of a header decompression control method according to the present exemplary embodiment.

Base station 10 sends channel quality information to mobile station 20 (step 2001). When mobile station 20 receives the channel quality information from base station 10 (step 2002), mobile station 20 compares the channel quality information with a threshold value to determine whether the channel quality represented thereby is poor or not (step 2003). A specific example of the process of judging the channel quality is the same as the specific example of the header compression control and will not be described in detail below.

If mobile station 20 judges that the channel quality is poor in step 2003, then mobile station 20 sets parameters (n, k) such that k/n is smaller than parameters (n, k) of a CRC which is carried out by header decompressor 221 (step 2004). If mobile station 20 judges that the channel quality is good, then mobile station 20 sets parameters (n, k) such that k/n is greater (step 2005).

For example, if the channel quality is good, then mobile station 20 controls parameters (n, k) such that (n, k)=(1, 1). Therefore, k/n=1/1=1, allowing header decompressor 221 to easily make a transition to a lower-level state. Header decompressor 221 immediately makes a transition to a lower-level state, and NACK or STATIC-NACK is sent as feedback information to base station 10. Since the header compression efficiency is lowered when the channel quality is good, the reliability of communications is increased.

If the channel quality is poor, then mobile station 20 controls parameters (n, k) such that (n, k)=(3, 2). Therefore, k/n=2/3=0.666 . . . , preventing header decompressor 221 from frequently making a transition to a lower-level state. If header decompressor 221 frequently makes a transition to a lower-level state, then NACK or STATIC-NACK is sent to base station 10 each time header decompressor 221 makes a transition to a lower-level state. However, as the feedback information is not sent to base station 10, the header compression efficiency is prevented from being lowered.

Transitions between the state modes, i.e., the U-mode, the R-mode, and the O-mode, in the wireless link may be controlled based on the channel quality information. FIG. 9 is a diagram showing transitions between the modes.

Compression controller 122 of base station 10 judges a channel quality from various pieces of channel quality information of each mobile station, and controls the state mode of the wireless link of each mobile station. If priority is given to the quality of communications with a communication partner, then compression controller 122 controls header compressor 121 such that the wireless link with the communication partner makes transitions U-mode→O-mode→R-mode. If priority is given to the efficiency of transmission to the communication partner, then compression controller 122 controls header compressor 121 such that the wireless link with the communication partner makes transitions R-mode→O-mode→U-mode. In this manner, it is possible to perform efficient transmission. If base station 10 carries out the header decompression control, then the decompression controller may control transitions of state modes of the wireless link as described above.

According to the present exemplary embodiment, the timer value which is representative of a time for the header compressor to make a transition to a lower-level state is controlled based on the circuit quality information even without the need to send feedback information indicative of the restoration of the header to the communication partner. If the channel state is poor, then the timer value is shortened to increase the frequency at which the header compressor makes a transition to a lower-level state, thereby increasing the reliability of communications rather than increasing the header compression efficiency. If the channel state is good, then the timer value is increased to reduce the frequency at which the header compressor makes a transition to a lower-level state, thereby increasing the header compression efficiency. In this manner, while the reliability of communications is maintained, the header compression efficiency is kept at an optimum level for efficient transmission. In particular, when the wireless link is in the U-mode, the present invention is effective as no feedback information is sent to the communication partner.

Since no feedback information needs to be sent to the communication partner, the amount of information sent over the transmission path is reduced to prevent the transmission efficiency from being lowered and also to prevent delays from occurring.

The header decompression side may also control the probability of transitions to lower-level states based on the channel quality information for efficiently transmitting packets.

As state transitions between the U-mode, the O-mode, and the R-mode are controlled based on the channel quality information, packets can be controlled depending on whether priority is to be given to compression efficiency or reliability.

As an example of the advantages of the present invention, header compression efficiency can be kept at an optimum level without the need for transmitting feedback information to the communication partner. Since no feedback information needs to be sent to the communication partner, the amount of information sent over the transmission path is reduced to prevent the transmission efficiency from being lowered and also to prevent delays from occurring.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

DESCRIPTION OF REFERENCE CHARACTERS

10 base station
20 mobile station
11, 21 storage device
12, 22 controller
121 header compressor
122 compression controller
221 header decompressor
222 decompression controller

The invention claimed is:

1. A communication device comprising:
   a header compressor which measures a time from a start of communications with a communication partner and changes a compression ratio of a header of a packet to a compression ratio lower than a present compression ratio each time that a time represented by a timer value elapses; and
   a controller which controls said timer value based upon information relating to a plurality of channel qualities comprising CQI, HARQ, ARQ, and a buffer quantity regarding the communication device and said communication partner
   wherein said controller determines whether or not each channel quality is good by comparing each channel quality with a corresponding threshold value,
   wherein if said controller judges that no more than one of the channel qualities is not good, then said controller makes said timer value longer than a present value, and
   wherein if said controller judges that more than one of the channel qualities are not good, then said controller makes said timer value shorter than the present value.

2. The communication device according to claim 1, further comprising:
   a header decompressor which performs a CRC on a packet received from said communication partner, and makes a transition to a lower-level state that represents that information about the header is insufficient, if k CRCs of n CRCs have failed and a value of k/n indicative of a ratio of failures is equal to or greater than a reference value;
   wherein said controller sets said reference value based on said information and controls said header decompressor.

3. The communication device according to claim 2, wherein if said controller judges that no more than one of the channel qualities is not good, then said controller sets said reference value to a value greater than a present value, and if said controller judges that more than one of the channel qualities is not good, then said controller sets said reference value to a value smaller than the present value.

4. The communication device according to claim 1, wherein said controller controls a mode of a wireless link with the communication partner based on said information.

5. A header compression control method performed by a communication device comprising:
- measuring, by the communication device, a time from a start of communications with the communication device and a communication partner and changing a compression ratio of a header of a packet to a compression ratio lower than a present compression ratio each time that a time represented by a timer value elapses; and
- controlling, by the communication device, said timer value based upon information relating to a plurality of channel dualities comprising CQI, HARQ, ARQ, and a buffer quantity regarding the communication device and said communication partner
- wherein when said timer value is controlled, determining whether or not each channel quality is good by comparing each channel quality with a corresponding threshold value,
- wherein if it is judged that no more than one of the channel qualities is not good, then said timer value is made longer than a present value, and
- wherein if it is judged that more than one of the channel qualities are not good, then said timer value is made shorter than the present value.

\* \* \* \* \*